United States Patent [19]
Pingel

[11] 3,810,311
[45] May 14, 1974

[54] LOCATING STOP FOR WORK TO BE MACHINED OR THE LIKE

[76] Inventor: Hans A. Pingel, 307 Souix Trl. (Lake in the Hills), Algonquin, Ill.

[22] Filed: June 15, 1972

[21] Appl. No.: 263,327

[52] U.S. Cl. .............................. 33/169 R, 33/172 D
[51] Int. Cl. ............................................... G01b 3/22
[58] Field of Search .......... 33/180 R, 172 R, 172 D, 33/169 R, 169 C; 248/121–122

[56] References Cited
UNITED STATES PATENTS

| | | | |
|---|---|---|---|
| 81,144 | 8/1868 | Cornell | 33/169 R |
| 3,129,512 | 4/1964 | Schiler | 33/169 R X |
| 2,611,968 | 9/1952 | Brown, Jr. | 33/169 R |
| 3,069,778 | 12/1962 | Schiler | 33/169 R X |
| 303,782 | 8/1884 | Wright | 33/169 R |
| 381,937 | 5/1888 | Linsley et al. | 33/169 R |
| 3,501,840 | 3/1970 | Schiler | 33/169 R |
| 2,625,746 | 1/1953 | Rudhart | 33/172 D |

Primary Examiner—John W. Huckert
Assistant Examiner—Milton S. Gerstein
Attorney, Agent, or Firm—Jones and Lockwood

[57] ABSTRACT

A work piece locating device particularly for vertical or horizontal milling machines. A clamping block slidably receives and clamps in adjusted position at right angles and offset from each other a mounting and a sliding rod. Slots are provided in the clamping block and one clamping screw secures both rods in the block. The second or sliding rod may protrude at each end from the block and is provided with a slot at each end to receive a locating or feeler rod or indicator gauge. A work piece is located in its desired position by being moved up to touch the end of the locating rod or to an indicator gauge adjusted position. There are cap screws at the ends of the sliding rod that clamp its slotted end portions up against the locating rods. The mounting rod is threaded at one end and may be threadedly received in a mounting hole. If mounting is in a T-slot of a machine work bed, than a T-nut and washer are employed to mount the rod on the work bed of a machine. The work piece locating device may have its mounting rod attached to a clamping vise mounted on a work bed. The jaws of the vise hold the work piece after it is positioned.

11 Claims, 5 Drawing Figures

PATENTED MAY 14 1974 3,810,311

LOCATING STOP FOR WORK TO BE MACHINED OR THE LIKE

This invention is directed to a locating stop for work.

It is an object of the invention to provide a locating stop for work that has a mounting rod permitting many different attitudes of mounting.

Another object of the invention is to provide in a locating stop a mounting block that is received on the mounting rod and that mounts a slide and clamp rod and has a single tightening cap screw for holding in adjusted positions the clamp block on its mounting rod and the slide and calmp rod which adjustably mounts at each of its ends work locating rods.

A further object of the invention is to provide a universal locating stop for work that provides for setting a number of positions for repeatedly locating work pieces.

A still further object of the invention is to provide a simply constructed yet universally and easily usable work stop for accurately and repeatedly positioning work pieces.

Other objects and advantages of the invention will become apparent upon reading the attached detailed description, and upon reference to the drawings in which.

Figure 1:
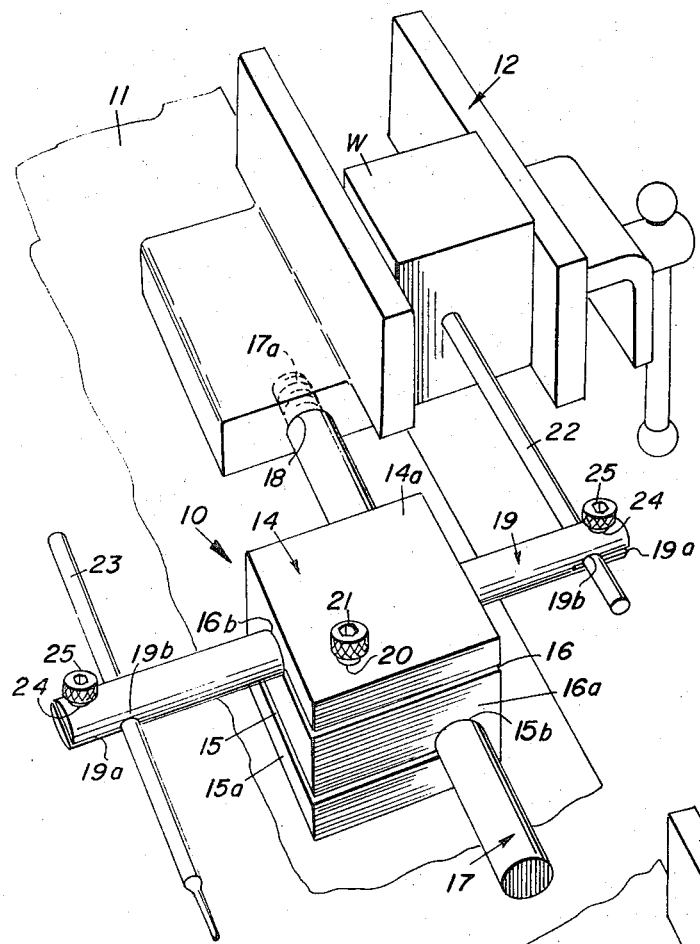
FIG. 1 is a perspective view of the locating stop mounted on a vise and positioning a work piece in the vise on a machine work bed.
Figure 2:
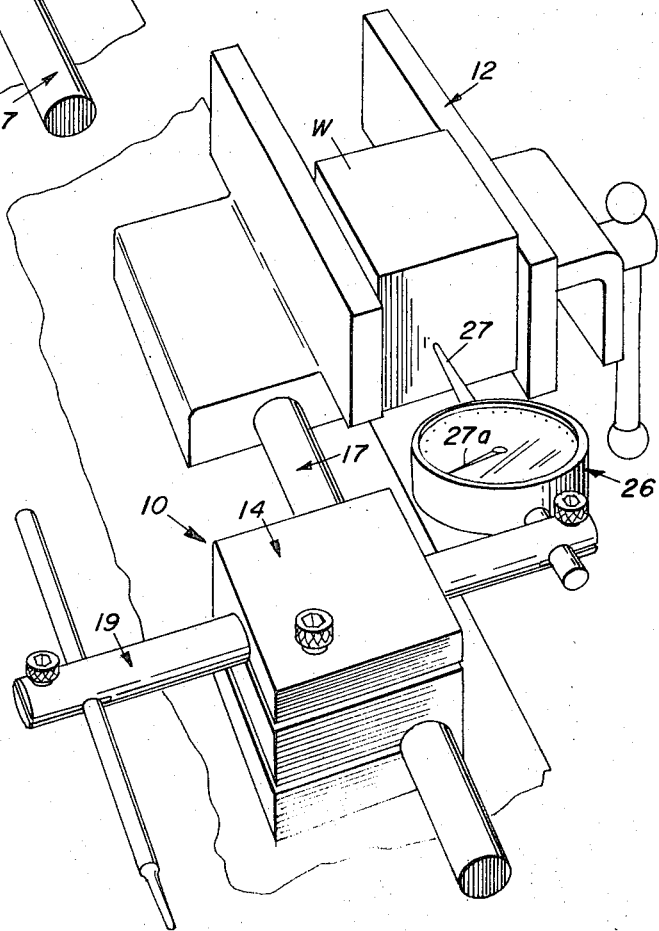
FIG. 2 is a perspective view similar to FIG. 1 but instead of the locator rod an indicator gauge is used.

In FIGS. 1 and 2 a locating stop is generally indicated at 10. FIG. 1 shows a locating rod while in FIG. 2 a locating gauge is substituted for the locating rod. There is as illustrative a work table 11 on which is mounted a clamping vise generally indicated at 12 which has positioned between its parallel jaws a work piece W which is to be located at a position along the jaws. This positioning can be readily duplicated for other like work pieces in a machine production set up.

The locating stop 10 is built up about a clamping block 14 that is formed with two spaced apart parallel slots 15 and 16 cut in from adjacent faces 15a and 16a.

Slot 15 substantially terminates in a cylindrical recess 15b which slidably receives a cylindrical mounting rod 17. Rod 17 has a reduced diameter threaded end 17a which is received in a threaded socket 18 in vise 12. Slot 16 substantially terminates in a cylindrical recess 16b which extends across the block and slidably receives a slide and clamp rod 19. Clamping block 14 has drilled or formed therein a cap screw receiving hole 20 from a face 14a of the block that is parallel to the slots 15 and 16. The hole extends across the slots and on into the opposite portion of block 14 from the face 14a where it is tapped with threads to receive a cap screw 21. On tightening the cap screw the parts of the block adjacent the slots are drawn together to clamp the block at an adjusted position along the mounting rod 17 and so also the slide and clamp rod 19 is clamped in a desired adjusted position.

The slide and clamp rod 19 has a slot 19a extending in from each end and at the proximal end of each slot is a transversely extending cylindrical recess 19b which receives a locating rod 22 at one end and a reserve locating rod 23 at the other end. Each of the locating rods is held in adjusted position by a cap screw 25 received in a bottom threaded hole 24 that clamps towards each other the bifurcated end of rod 19.

In FIG. 2 an indicator gauge 26 is substituted for the locating rod 22 and it has a feeler finger 27 and an indicator hand 27a to locate the work piece. Each time the new work piece is brought to the desired position by movement into position against the finger 27 until the established reading for hand 27a is obtained.

Figure 3:
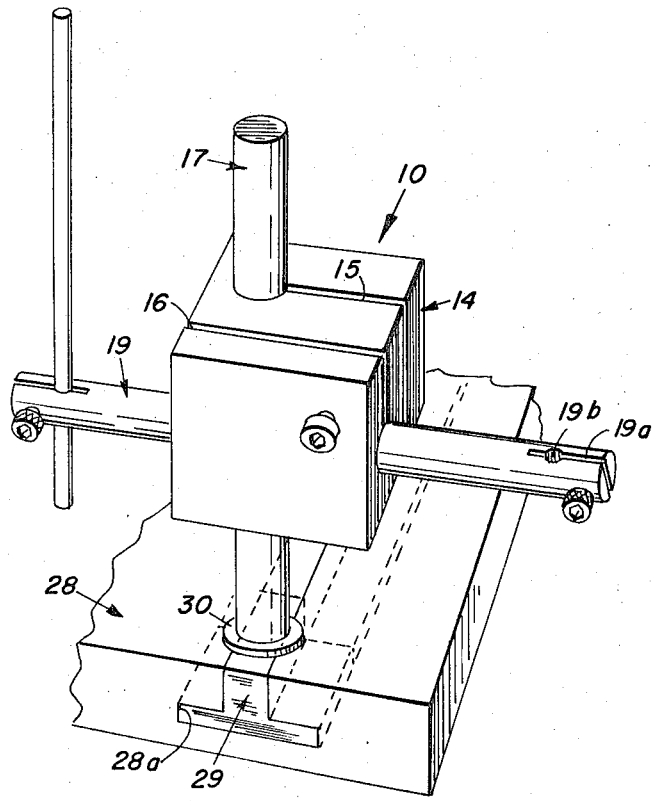
FIG. 3 is a perspective view of the locating stop shown mounted with a T-nut in a slot of a work table.
Figure 4:
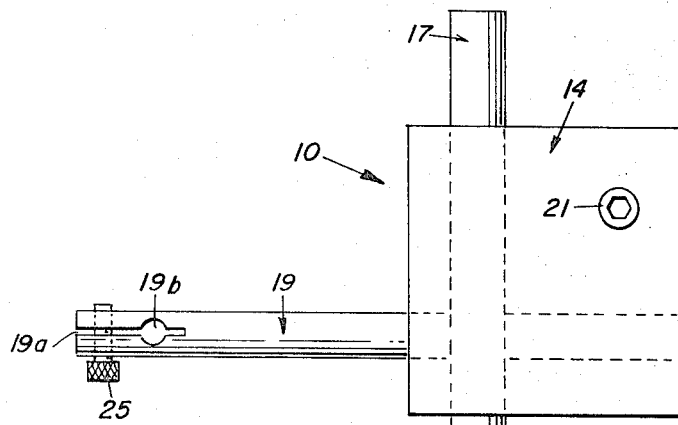
FIG. 4 is a front elevation of the locating stop as seen in FIG. 3 but unmounted and without locating rods.
Figure 5:
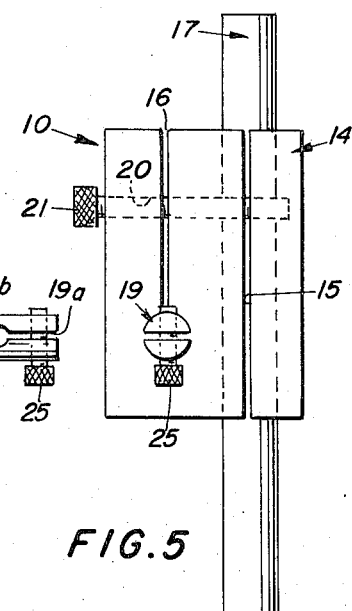
FIG. 5 is a side elevation view of the locating stop in FIG. 4.

In FIG. 3 the locating stop 10 is mounted directly on a machine slotted bed 28 having a T-slot 28a. The locating stop 10 has its mounting rod threaded end 17a received in a threaded recess 29a, see FIGS. 4 and 5, of a T-nut 29 received in slot 28a. A flat washer 30 may be used on the end of rod 17 in mounting the same as shown in FIG. 3.

What is claimed is:

1. A locating stop for work com-prising in combination a mounting rod having means at one end for mounting the same, a slidable clamp rod for slidably receiving and supporting locating means for work, a clamping block, said clamping block having two apertures extending therethrough offset from each other and extending at an angle to each other and each receiving one of said rods, said block having slots extending thereinto from adjacent faces of the block and substantially terminating at their inner ends in said respective apertures, said block having an aperture extending into the block from another face of the block and across said slots and into a portion of the block where its inner end portion is threaded, a cap screw received in said aperture and threadedly received in the threaded inner end of the aperture and on tightening draws towards each other portions of the block defining said slots and tightens the walls of said apertures against said rods, said slidable clamp rod having means formed at its ends for slidably receiving and supporting and clamping therein said locating means for work being located by the locating stop.

2. A locating stop for work according to claim 1 wherein said slots in the clamping block lie in respective planes that are parallel to each other.

3. A locating stop for work according to claim 1 wherein the angle is a right angle at which said apertures in the block extend to each other.

4. A locating stop for work according to claim 1 wherein said slidable clamp rod has an aperture extending through each end transverse to the axis of said clamp rod and is formed with bifurcations at its ends which join at their inner ends with said aperture extending transversely to the axis of said slidable clamp rod and a transversely extending aperture through said bifurcations in each end of the clamp rod, said last mentioned aperture being threaded at an end thereof and receiving a cap screw for tightening the walls of said aperture receiving the locating means for the work whereby is provided said means at the ends of said slidable clamp rod for slidably receiving and supporting and clamping said locating means for the work.

5. A locating stop for work according to claim 4 wherein said locating means are locating rods.

6. A locating stop for work according to claim 4 wherein at least one of said locating means is a gauge having a feeler finger contacting the work and an indicator hand positioned at a desired position over a face of the gauge.

7. A locating stop for work according to claim 2 wherein said slidable clamp rod has an aperture extending through each end transverse to the axis of said clamp rod and is formed with bifurcations at its ends which join at their inner ends with said aperture extending transversely to the axis of said slidable clamping rod and a transversely extending aperture through said bifurcations in each end of the clamp rod, said last mentioned aperture being threaded at an end thereof and receiving a cap screw for tightening the walls of the aperture receiving the locating means for the work whereby is provided said means at the ends of said slidable clamp rod for slidably receiving and supporting and clamping said locating means for the work.

8. A locating stop for work according to claim 7 wherein said locating means are locating rods.

9. A locating stop for work according to claim 7 wherein at least one of said locating means is a gauge having a feeler finger contacting the work and an indicator hand positioned at a desired position over a face of the gauge.

10. A locating stop for work comprising in combination a mounting rod having means at one end for mounting the same, a slidable clamp rod for slidably receiving and supporting locating means for work, a clamping block, offset clamping block having two apertures extending therethrough offse from each other and each receiving one of said rods, said block having slots extending thereinto from adjacent faces of the block and substantially terminating at their inner ends in said respective apertures, said block having an aperture extending into the block from another face of the block and across said slots and into a portion of the block where its inner end portion is threaded, a cap screw received in said aperture and threadedly received in the threaded inner end of the aperture and on tightening draws towards each other portions of the block defining said slots and tightens the walls of said apertures against said rods, said slidable clamp rod having an aperture extending through each end transverse to the axis of the clamp rod and is formed with bifurcations at each end that join at their inner ends with said aperture extending transversely to the axis of said slidable clamp rod and a transversely extending aperture through said bifurcations in each end of the clamp rod, said aperture being threaded at an end thereof and receiving a cap screw for tightening the walls of said aperture at the end of the bifurcations on said locating rod slidably received therein.

11. A locating stop for work according to claim 10 wherein at least one of said locating rods has substituted therefore a gauge having a feeler finger contacting the work and an indicator hand positioned at a desired position over a face of the gauge.

* * * * *